United States Patent
Arnold, II

(10) Patent No.: US 6,941,188 B1
(45) Date of Patent: Sep. 6, 2005

(54) METHOD OF SHAPING A FOAM ARTICLE

(75) Inventor: Roger Arnold, II, Waterford, MI (US)

(73) Assignee: Creative Seating Innovations, Inc., Troy, MI (US)

( * ) Notice: Subject to any disclaimer, the term of this patent is extended or adjusted under 35 U.S.C. 154(b) by 0 days.

(21) Appl. No.: 10/832,227

(22) Filed: Apr. 26, 2004

(51) Int. Cl.[7] .............................................. G06F 19/00
(52) U.S. Cl. ....................... 700/191; 700/118; 408/1 R
(58) Field of Search ................................ 700/191, 163, 700/97, 159, 118; 29/557; 408/1 R

(56) References Cited

U.S. PATENT DOCUMENTS

| | | | |
|---|---|---|---|
| 3,869,831 A * | 3/1975 | Gibb ............................ | 451/28 |
| 4,555,836 A | 12/1985 | Martin | |
| 4,621,956 A * | 11/1986 | Hartman et al. ............ | 408/1 R |
| 4,675,825 A * | 6/1987 | DeMenthon ................ | 700/160 |
| 4,867,922 A * | 9/1989 | Zuccato ...................... | 264/40.1 |
| 4,890,235 A * | 12/1989 | Reger et al. ................ | 700/118 |
| 4,946,320 A | 8/1990 | VanderMey | |
| 5,050,472 A * | 9/1991 | Potzsch ....................... | 83/424 |
| 5,872,714 A * | 2/1999 | Shaikh et al. ............... | 700/98 |
| 5,880,964 A * | 3/1999 | Schall et al. ................ | 700/159 |
| 6,144,890 A * | 11/2000 | Rothkop ...................... | 700/97 |
| 6,588,086 B2 | 7/2003 | Trybus | |
| 6,597,965 B2 * | 7/2003 | Graves et al. .............. | 700/159 |

\* cited by examiner

*Primary Examiner*—Leo Picard
*Assistant Examiner*—Alexander Kosowski
(74) *Attorney, Agent, or Firm*—Brooks Kushman P.C.

(57) ABSTRACT

A method of making a shaped article from a block of foam is disclosed. The method comprises programming a milling machine with coordinates for a desired surface contour of a prototype foam body. A block of foam is cut using a milling machine to remove one or more portions of a first side of the foam block to the contour of the desired surface contour. One or more spaced pockets are formed while leaving at least one supporting portion on the first side of the foam block. The block of foam is then milled to remove a second side of the foam block to the desired depth of the surface contour wherein the second side is on the opposite side of the foam block from the first side. The first side of the foam block is then cut to remove the supporting portion at the level of the desired surface contour.

18 Claims, 6 Drawing Sheets

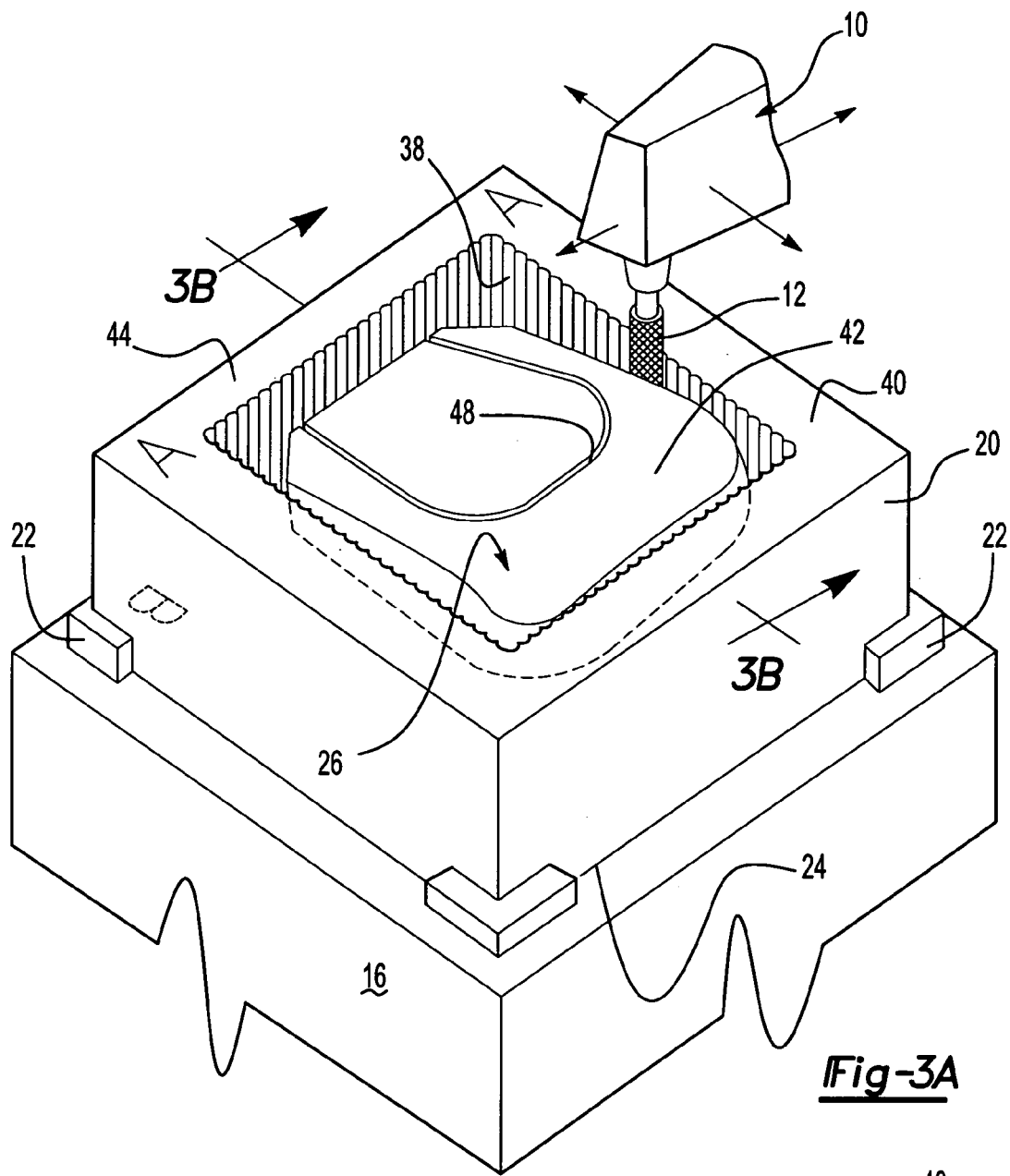
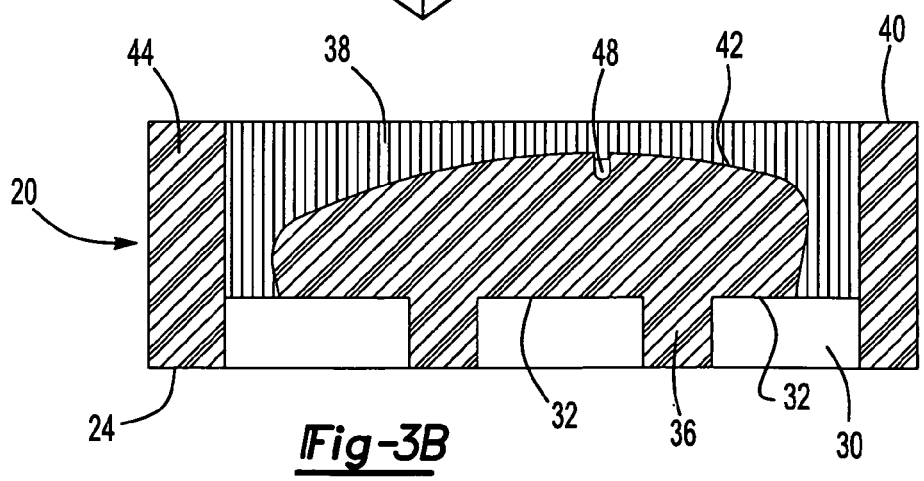

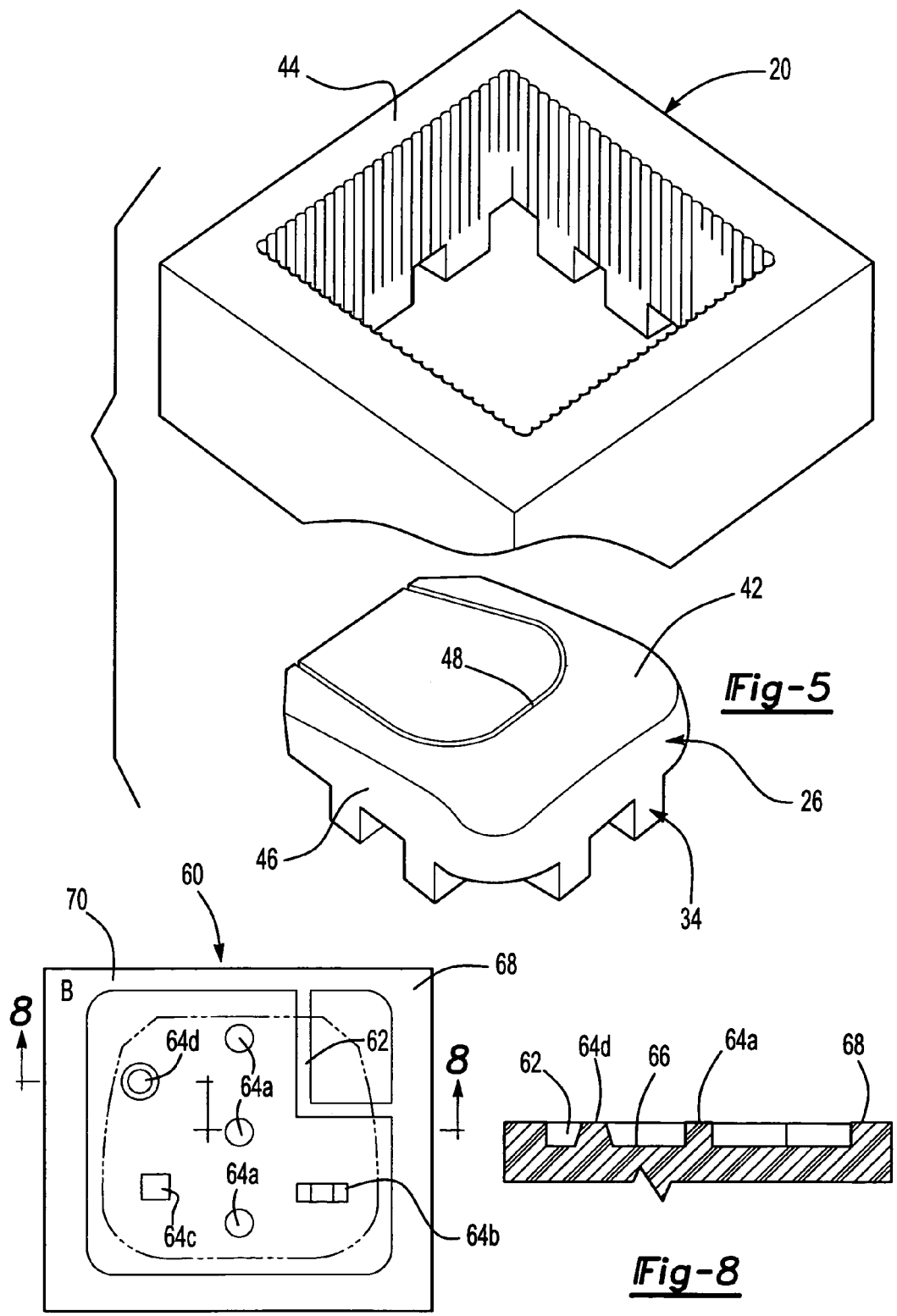

METHOD OF SHAPING A FOAM ARTICLE

BACKGROUND OF THE INVENTION

1. Field of the Invention

The present invention relates to a method of shaping a foam article having opposite sides that are formed, at least in part, in a milling operation.

2. Background Art

A wide variety of shaped articles may be made from foam polymeric materials. A popular polymeric foam material is foam polyurethane. Polyurethane foam may be provided in a range of densities and, depending upon its density and composition, may have varying degrees of elasticity. If a foam article is to be shaped on opposite sides, increased flexibility can make it difficult to support the foam body as it is shaped. One example of a foam article is a foam bun for a vehicle seat. Other foam bodies may include furniture cushions, toys, and padding for vehicle interior parts.

Foam buns for vehicle seats are normally produced in production processes in which a two-component polyurethane reactant mixture is poured into a specially designed mold that forms the seat body in situ to the desired size and shape. Pre-production or prototype foam buns must be made without the benefit of a production mold due to the relatively high cost of making a mold. Frequently, an automotive manufacturer will require several prototype designs for evaluation prior to committing to a final production design. Once a final production design is selected, a mold can be made based upon the approved prototype design.

A block of pre-formed foam may be cut with a knife or formed with a programmable milling machine to make pre-production samples and prototypes. While this approach eliminates the need for an expensive molding tool, it is difficult to accurately cut a block of flexible foam due to the tendency of the foam material to be distorted as pressure is applied to the foam block. This is particularly problematic when one side of the foam block has been cut to a desired contour and then an opposite side must be shaped while the previously shaped side supports the foam block.

One proposed solution to the above problem is disclosed in U.S. Pat. No. 6,588,086 that issued to Trybus ("the '086 patent"). In the method disclosed in the '086 patent, one side of a foam block is milled to the desired contour creating loose granular waste that would normally be vacuumed to a waste receptacle. According to the method disclosed in the '086 patent, the loose granular fill material is placed back in the cavity formed when the first side is milled. A sheet is then secured over the loose granular film material to hold the fill material in place in the cavity while the second or opposite side of the foam block is shaped. The loose granular fill material helps to reduce distortion and support the foam block. However, it is time consuming to pack the cavity with the granular fill material, cover it with a sheet of material, shape the second side of the foam block material, and then remove the granular material. The loose granular material is difficult to control if not contained and must be frequently removed from clothing and surrounding areas. In addition, there is a possibility that insufficient or excessive granular fill material may be loaded into the cavity that can cause dimensional variation in the finished product.

There is a need for a quick and accurate process for shaping a foam article that is contoured on opposite sides from a block of foam. There is a further need for a process wherein computer-aided design data can be used as a starting point for optimizing control of a programmable milling machine to form a shaped foam article that is shaped on opposite sides to design tolerances. There is also a need for an efficient labor-saving process for forming opposite sides of a foam article.

The present invention addresses the above problems and needs as summarized below.

SUMMARY OF THE INVENTION

According to one aspect of the present invention, a method of making a foam article from a block of foam is provided. According to the method, a milling machine is programmed with spatial coordinates corresponding to a first side and a second side of a desired surface contour. The block of foam is then cut using the milling machine to remove at least one portion of a first side of the foam block to the depth of the desired surface contour while leaving intact at least one supporting portion of the first side of the foam block. The foam block is then inverted and cut using the milling machine to remove a second side of the foam block to the desired surface contour. The second side is on the opposite side of the foam block from the first side. The first side of the foam block is then cut with a knife or other cutting tool to remove the supporting portion at the level of the desired surface contour. As the supporting portion is removed, the first side is shaped to form the first side of the surface corresponding to the desired surface contour.

According to another aspect of the present invention, a method of making a foam prototype for a vehicle seat body from a block of foam is provided. According to the method, at least sone region is milled in a bottom side of the foam block to a depth corresponding to a portion of a bottom surface of a desired surface of the prototype while leaving at least one supporting portion of the foam block in place. Next, a top side of the foam block is milled to form a top surface corresponding to a desired top surface of the prototype with the supporting portion functioning to hold the foam block in position and minimizing distortion of the shape of the foam block caused by milling the top side. The supporting portion is then cut off of the bottom side of the foam block to the approximate level of the bottom surface.

Other aspects of the above-described method may further include programming the milling machine with coordinates as to the desired location of a plurality of supporting portions that are to be provided on the first side of the foam block. A plurality of spaced pockets may be defined between the plurality of supporting portions. The supporting portions may comprise a plurality of ribs that extend from an outer surface of the block of foam to the surface contour of the prototype foam body. The supporting portions may also comprise rectangular, cylindrical, conical, polygonal, or irregularly shaped posts, walls, or other shaped extensions that extend from the outer surface of the foam block to the surface of the contour of the foam body.

According to other aspects of the invention, the methods described above may further comprise cutting the first side of the foam block with a knife to remove the supporting portions. In addition, the first side of the foam block may be ground with a grinding tool after cutting the supporting portions to connect the spaced pockets, or regions, and form a continuous surface contour.

According to other aspects of the invention, the methods may also include the step of programming a computer with data corresponding to the desired surface of the prototype on both the top side and bottom side of the foam block and also providing the data to a milling machine. According to the invention, the data may be modified in the computer to define the shape of supporting portions. During the step of providing the data to the milling machine, portions of the desired surface on the bottom side of the prototype may not be provided to the milling machine and the milling machine is controlled to not mill the foam block outboard of such portions.

Finally, according to yet another aspect of the method of the present invention, side portions of the foam block that are laterally outboard of the milled portion of the top and bottom sides of the foam block may be removed by cutting a side edge of the prototype foam body to separate the prototype from the block of foam.

These and additional aspects of the invention will be better understood in view of the attached drawings and the following detailed description of the preferred embodiments.

BRIEF DESCRIPTION OF THE DRAWINGS

FIG. 3A is a perspective view of a milling machine cutting a second side of a foam block to a desired surface contour;

FIG. 3B is a cross-sectional view taken along line 3B—3B in FIG. 3A;

FIG. 5 is an exploded perspective view of a partially formed article removed from surrounding portions of a foam block;

FIG. 7 is a plan view of an alternative embodiment of a foam block showing supporting portions on the first side of the shaped article;

FIG. 8 is a fragmentary cross-sectional view taken along the line 8—8 in FIG. 7.

DETAILED DESCRIPTION OF THE PREFERRED EMBODIMENT(S)

Figure 1:
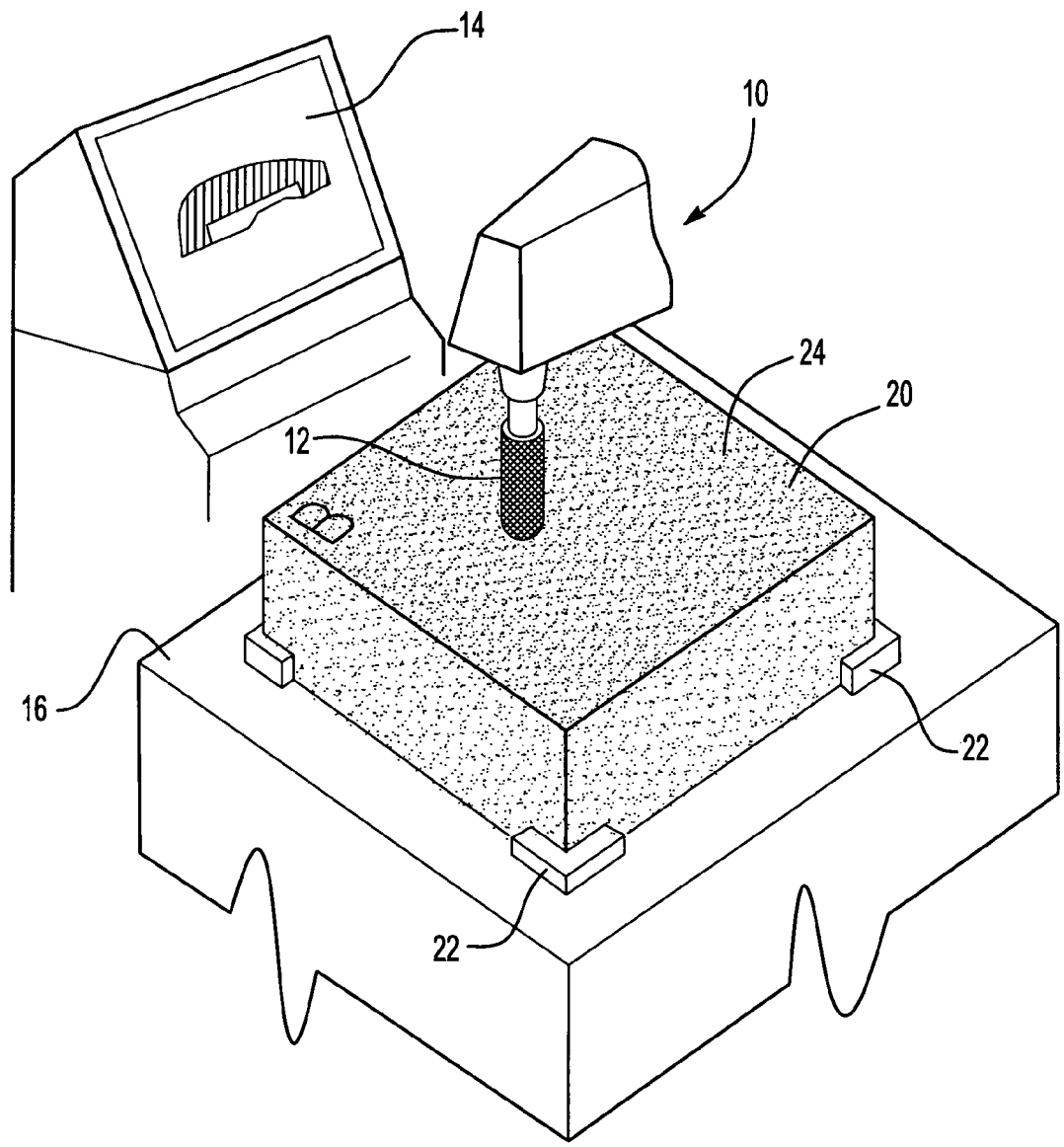
FIG. 1 is a perspective view of a computer controlled milling machine preparing to cut a block of foam in accordance with one embodiment of the present invention.

Referring to FIG. 1, a programmable milling machine 10 is illustrated that operates a milling tool 12 that is controlled by a computer control 14. The programmable milling machine 10 has a tool bed 16 on which a foam block 20 may be secured with locators 22. As shown in FIG. 1, a B surface 24 of the foam block 20 is oriented to be milled by the milling tool 12.

The computer control 14 may be programmed using computer-aided design (CAD) data that corresponds to the shape of an article 26 to be machined by the milling machine 10. The CAD data is preferably modified to include coordinates of supporting portions that will be more specifically described below. The supporting portions support the foam block 20 during the milling process and are subsequently removed to provide an article 26 having the desired shape.

Figure 2A:
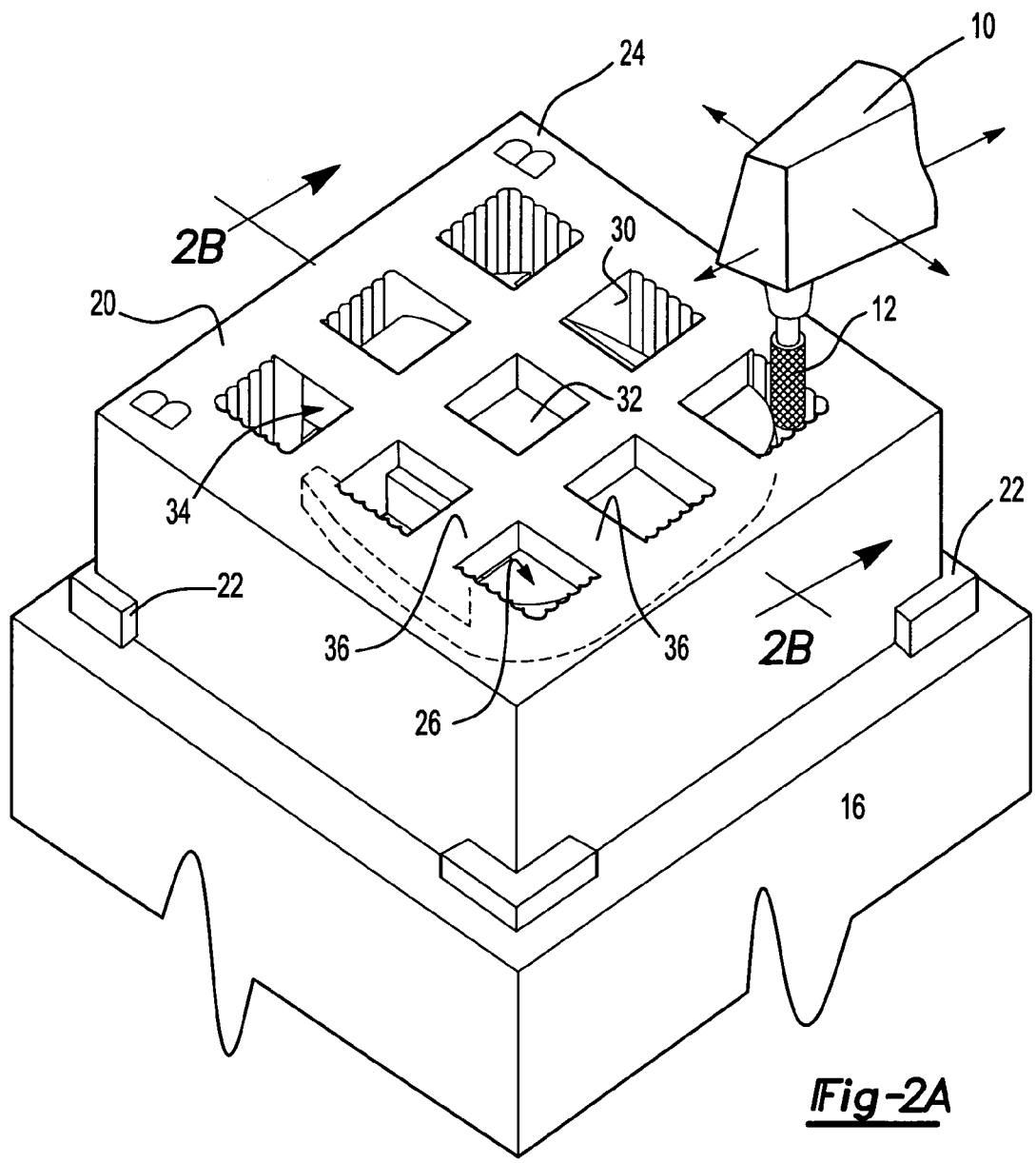
FIG. 2A is a perspective view of the milling machine milling a first side of an article while leaving a supporting portion of the block of foam in place.
Figure 2B:
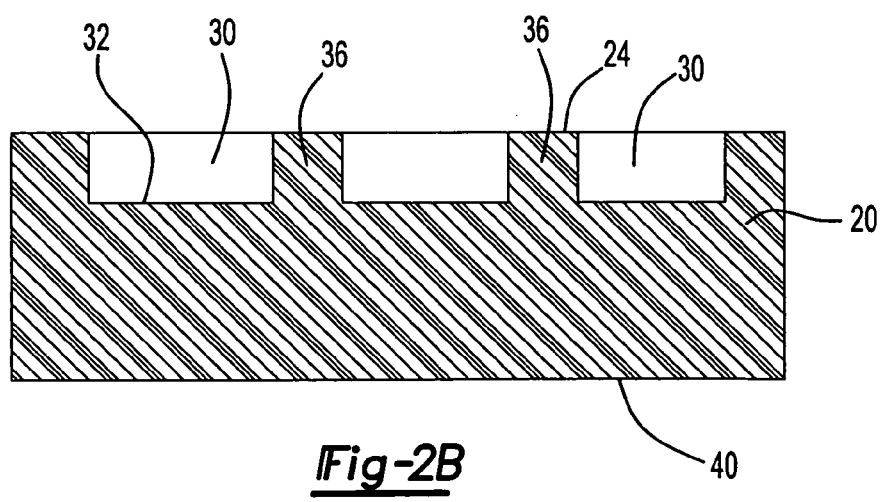
FIG. 2B is a cross-sectional view taken along line 2B—2B in FIG. 2A.

Referring to FIGS. 2A and 2B, the milling tool 12 is shown forming a plurality of pockets 30 in the B surface 24 of the foam block 20. The pockets 30 are formed to the depth of a B side surface contour 32 that is defined by the CAD data provided to the computer control 14. Supporting portions, generally indicated by reference numeral 34 in the illustrated embodiment, may comprise a plurality of intersecting bars 36. The intersecting bars 36 generally form a grid of unremoved portions of the B surface 24. It should be understood that other grid patterns or independent supporting members may be provided to support the foam block 20 during subsequent milling operations.

Referring to FIGS. 3A and 3B, the milling tool 12 is shown operating on the foam block 20 that has been inverted and placed on the tool bed 16 with the B surface 24 in contact with the tool bed 16 and the A side 40 facing upwardly to be machined by the milling tool 12. A cavity 38 is formed by the milling operation. The cavity 38 is formed to the depth of an A side surface contour 42 that corresponds to CAD data programmed to the computer control 14. An area of peripheral material 44 is shown outboard of the A side surface contour 42. The peripheral material 44 is scrap material that is trimmed from the sides of the article to be formed. A feature line groove 48 is shown in the A side surface contour 42. The feature line groove 48 could be formed by the milling machine using a smaller milling tool or can be formed with a cutting tool either during the milling process or may be formed by cutting or grinding operation after the article is removed from the milling machine 10. The feature line groove 48 could be provided to provide clearance for a seat cover seam or bead welt (not shown) of a vehicle seat cover.

Figure 4:
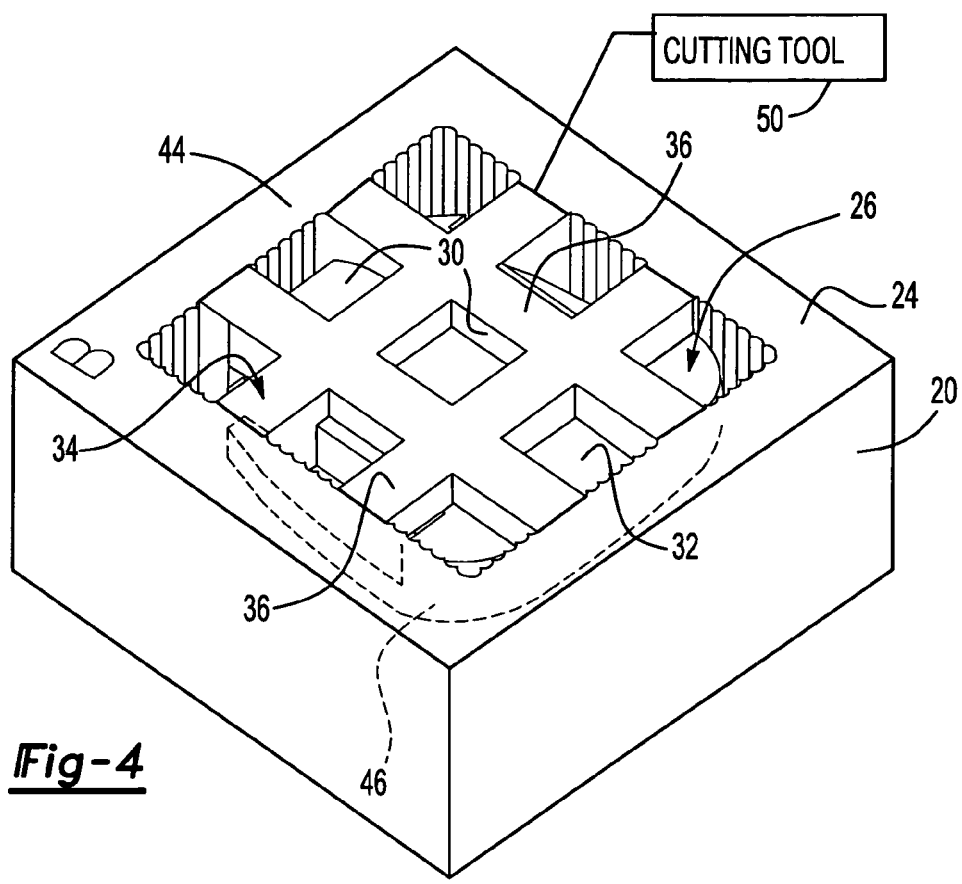
FIG. 4 is a perspective view of a foam block with an article having been partially shaped by a milling machine with a cutting tool diagrammatically shown for trimming the article from the peripheral portions of the foam block.

Referring to FIG. 4, a foam block 20 is shown with the B surface 24 being oriented to be cut by a cutting tool 50. Cutting tool 50 could be a power knife, a conventional knife, or a milling tool that is used to sever the supporting portion 34 comprising the intersecting bars 36 from the peripheral material 44. It should be understood that the supporting portions 34 may be separate from the peripheral material 44 and, if so, would not require cutting therefrom. As the supporting portions 34 are cut from the peripheral material 44, the article can be further shaped. The supporting portions 34 may also be separately formed to stand independently of the peripheral material 44.

Referring to FIG. 5, the article to be formed having the A side surface contour 42 is shown after a side edge 46 of the article 26 is separated from the peripheral material 44. The feature line groove 48 is shown formed in the A side surface contour 42.

Figure 6:
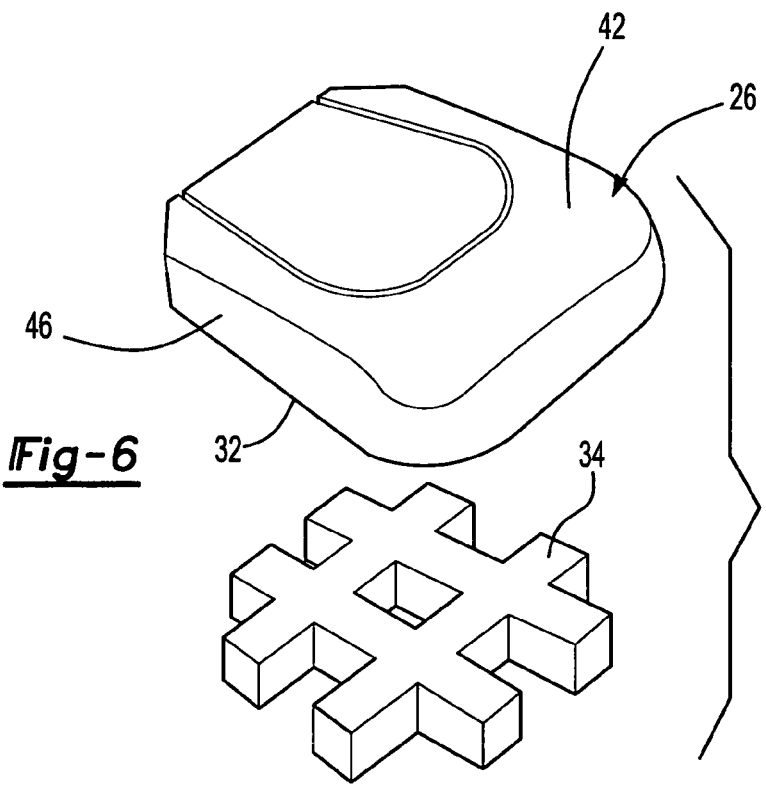
FIG. 6 is an exploded perspective view showing supporting portions on the first side being removed from the shaped article.

Referring to FIG. 6, the article 26 to be formed is shown separated from the supporting portion 34. The supporting portion 34 is separated from the B side surface contour 32. This may be done in one piece as shown, but would be more likely be separated in pieces using an electric knife or other cutting tool that cuts along the B side surface contour 32 between the pockets 30 to remove the supporting portion 34. A grinding tool also may be used to smooth the B side surface contour 32.

Referring to FIGS. 7 and 8, an alternative embodiment of a foam block 60 is shown. The foam block is shown with support walls 62 and cylindrical support posts 64a extending from a B side surface of the prototype 66. Also illustrated are independent members such as a freestanding rectangular wall 64b, a rectangular post 64c, and a truncated cone shaped post 64d, any of which could be used as supporting members. Peripheral material 68 is shown outboard of the B side surface of the prototype 66 that is trimmed from the prototype 66 as described above. The support posts 64 and support walls 62 extend from the outer surface of the B side 70 of the foam block 60 as previously described. The process of making the article according to the alternative embodiment proceeds in accordance with the process described above.

Figure 9:
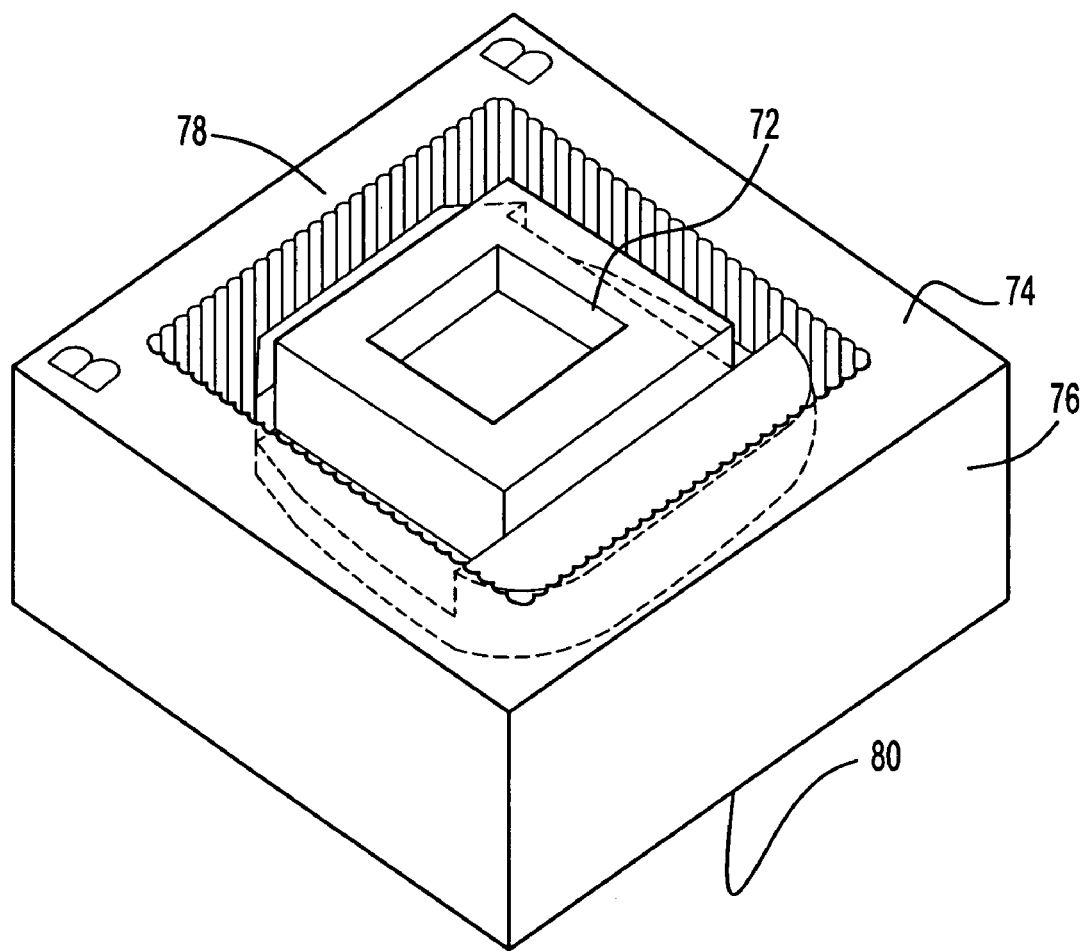
FIG. 9 is a plan view of another alternative embodiment of a foam block showing other types of supporting portions on the first side of the shaped article.

Referring to FIG. 9, another alternative embodiment is illustrated in which a freestanding support member 72 is provided on the b-side or first side 74 of the foam block 76. The freestanding support member as shown is a square frame centered on the first side 74 and unattached to peripheral portions 78 of the foam block 76. In this embodiment, substantial support may be provided when the second, or A side, of the foam member 80 is milled. An advantage of this embodiment is that less cutting is required to separate the foam member 80 from the peripheral portions 78 of the foam block 76 and less cutting is required to remove the support member 72 from the B side 74 of the foam member 80.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a contoured foam body from a block of foam, comprising:

programming a milling machine with coordinates for a desired surface contour of a first side and a second side of the contoured foam body;

cutting the block of foam using the milling machine to remove a portion of a first side of the foam block to the depth of the desired surface contour to form at least one pocket while leaving at least one supporting portion of the foam block intact on the first side of the foam body, wherein the supporting portion is a grid that extends in a direction normal to an outer surface of the block of foam to the surface contour of the contoured foam body;

cutting the block of foam using the milling machine to remove the second side of the foam block to the depth of the desired surface contour, the second side being on the opposite side of the foam block from the first side;

cutting the first side of the foam block to remove the supporting portion proximate the desired surface contour, wherein by removing the supporting portion the first side of the foam body is formed to the desired surface contour.

2. The method of claim 1, further comprising:

programming the milling machine with coordinates for the supporting portion on the first side of the foam.

3. The method of claim 1 wherein the grid extends across the first side between a plurality of spaced peripheral portions of the block.

4. The method of claim 1 wherein the grid extends only partially across the first side.

5. The method of claim 1, wherein the supporting portion further comprises at least one post that extends from an outer surface of the block of foam to the surface contour of the contoured foam body.

6. The method of claim 1, wherein the step of cutting the first side of the foam block to remove the supporting portion is performed with a knife.

7. The method of claim 1, further comprising grinding the first side of the foam block after cutting the supporting portion to form a continuous surface contour.

8. A method of making a foam prototype for a vehicle seat body from a block of foam, comprising:

milling at least one pocket in a bottom side of the foam block to a depth corresponding to a portion of a bottom surface of a desired surface of the prototype while leaving at least one supporting portion of the foam block in place, wherein the supporting portion comprises a plurality of ribs that extend from an outer surface of the block of foam to the surface contour of the prototype;

milling a top side of the foam block to form a top surface corresponding to a desired top surface of the prototype with the supporting portion functioning to hold the foam block and minimizing distortion of the shape of the foam block caused by milling the top side; and cutting the supporting portion off of the bottom side of the foam block to the approximate level of the desired surface of the bottom surface.

9. The method of claim 8, further comprising:

grinding the bottom side of the foam block to the level of the desired surface of the prototype.

10. The method of claim 8, further comprising:

programming data into a computer corresponding to the desired surface of the prototype on both the top side and the bottom side of the foam block; and providing the data to a milling machine.

11. The method of claim 10, further comprising:

modifying the data in the computer to define the shape of the supporting portion wherein during the step of providing the data to the milling machine, at least one portion of the desired surface on the bottom side of the prototype is not provided to the milling machine and the milling machine is controlled to not mill the foam block outboard of such portion.

12. The method of claim 8, further comprising:

programming the milling machine with coordinates for the supporting portion on the first side of the foam.

13. The method of claim 8, wherein the supporting portion comprises at least one independent member that extends from an outer surface of the block of foam to the surface contour of the prototype foam body.

14. The method of claim 8, wherein the step of cutting the first side of the foam block to remove the supporting portion is performed with a knife.

15. The method of claim 8, further comprising grinding the first side of the foam block after cutting the supporting portion to form a continuous surface contour.

16. The method of claim 8, wherein peripheral portions of the foam block are laterally outboard of the milled portions of the top and bottom sides of the foam block, the method further comprising:

cutting a side edge of the prototype to separate the prototype from the peripheral portions of the block of foam.

17. A method of making a foam prototype for a vehicle seat body from a block of foam, the seat body being formed to a desired surface, the method comprising:

milling a pocket in a bottom side of the foam block to a depth corresponding to portions of a bottom surface of a desired surface of the prototype while leaving supporting portions of the foam block in place, the supporting portions being free-standing portions that are defined by the pocket;

milling a top side of the foam block to form a top surface of the desired surface of the prototype with the supporting portions on the bottom side functioning to hold the foam block and minimizing distortion of the shape of the foam block caused by milling the top side; and cutting the supporting portions off of the bottom side of the foam block to the approximate level of the depth of the pocket.

18. The method of claim 17 wherein at least one of the supporting portions is a rib extending at least partially across the pocket.

* * * * *